(12) United States Patent
Fukui et al.

(10) Patent No.: US 10,669,207 B2
(45) Date of Patent: Jun. 2, 2020

(54) DIELECTRIC CERAMIC COMPOSITION AND ELECTRONIC COMPONENT

(71) Applicant: TDK CORPORATION, Tokyo (JP)

(72) Inventors: Takashi Fukui, Tokyo (JP); Hisashi Kobuke, Tokyo (JP); Atsushi Ishimoto, Tokyo (JP); Masanori Abe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/136,767

(22) Filed: Sep. 20, 2018

(65) Prior Publication Data

US 2019/0092692 A1   Mar. 28, 2019

(30) Foreign Application Priority Data

Sep. 26, 2017   (JP) .................................. 2017-184689
Aug. 7, 2018    (JP) .................................. 2018-148556

(51) Int. Cl.
*C04B 35/20*      (2006.01)
*H01G 4/12*       (2006.01)

(52) U.S. Cl.
CPC .......... *C04B 35/20* (2013.01); *H01G 4/1245* (2013.01); *C04B 2235/3208* (2013.01); *C04B 2235/3213* (2013.01); *C04B 2235/3215* (2013.01); *C04B 2235/3217* (2013.01); *C04B 2235/3232* (2013.01); *C04B 2235/3244* (2013.01); *C04B 2235/3262* (2013.01); *C04B 2235/3281* (2013.01); *C04B 2235/3409* (2013.01); *C04B 2235/3445* (2013.01); *C04B 2235/36* (2013.01); *C04B 2235/408* (2013.01); *C04B 2235/77* (2013.01); *C04B 2235/96* (2013.01)

(58) Field of Classification Search
CPC ...................................................... C04B 35/20
See application file for complete search history.

(56) References Cited

U.S. PATENT DOCUMENTS

| 2006/0293168 | A1* | 12/2006 | Mori | ....................... | C03C 3/066 |
| | | | | | 501/136 |
| 2007/0128450 | A1* | 6/2007 | Mori | ....................... | C03C 3/066 |
| | | | | | 428/432 |
| 2007/0237935 | A1* | 10/2007 | Mori | ....................... | C03C 3/066 |
| | | | | | 428/210 |
| 2010/0197478 | A1* | 8/2010 | Suzuki | .................... | C04B 35/20 |
| | | | | | 501/108 |
| 2010/0248927 | A1* | 9/2010 | Arashi | .................... | C04B 35/20 |
| | | | | | 501/32 |

FOREIGN PATENT DOCUMENTS

JP        2008-037739 A       2/2008

* cited by examiner

*Primary Examiner* — Karl E Group
(74) *Attorney, Agent, or Firm* — Oliff PLC

(57) ABSTRACT

A dielectric ceramic composition includes: $Mg_2SiO_4$ as main component; R-containing, Cu-containing, and B-containing compounds, and Li-containing glass, as sub-component. R is an alkaline earth metal. R-containing compound greater than or equal to 0.2 part by mass and less than or equal to 4.0 parts by mass, contained in terms of oxide, Cu-containing compound of greater than or equal to 0.5 part by mass and less than or equal to 3.0 parts by mass, contained in terms of oxide, and B-containing compound greater than or equal to 0.2 part by mass and less than or equal to 3.0 parts by mass, contained in terms of oxide, to 100 parts by mass of main component. Li-containing glass of greater than or equal to 2 parts by mass and less than or equal to 10 parts by mass contained to total a 100 parts by mass of main component, and sub-component excluding Li-containing glass.

20 Claims, No Drawings

DIELECTRIC CERAMIC COMPOSITION AND ELECTRONIC COMPONENT

TECHNICAL FIELD

The present invention relates to a dielectric ceramic composition and an electronic component.

BACKGROUND

Recently, in a mobile communication apparatus such as a smart phone, of which the demand has increased, a high frequency band referred to as a so-called quasi-microwave of approximately several hundred MHz to several GHz, is used. For this reason, an electronic component used in the mobile communication apparatus is required to have various properties suitable to be used in a high frequency band. Then, an excellent low temperature co-fired ceramic (LTCC) material, which is suitable to be used in the high frequency band, has been required. In particular, various methods have been proposed in order to obtain the LTCC material which is capable of co-firing with an Ag internal electrode, and is excellent in various properties.

In Patent document 1, a glass ceramic composition containing forsterite as a main component, and ZnO or the like as an sub-component, has been proposed. The glass ceramic composition described in Patent document 1, contains ZnO as the sub-component, and thus, in a case where firing is performed at a low temperature of lower than or equal to 1000° C., it is easy to perform sufficient densification.

However, in order to correspond to thinning of a ceramic layer according to a reduction in size of the electronic component in recent years, and a frequency band higher than ever before, in particular, in a case where the co-firing is performed with the Ag internal electrode, a Q value and humidity resistance of the LTCC material are required to be further improved than ever before.

[Patent Document 1] JP 2008-37739A

SUMMARY

It is an object of the invention to provide a dielectric ceramic composition which is capable of low temperature sintering, is capable of co-firing with an Ag electrode, and is excellent in a Q value and humidity resistance after the sintering.

In order to attain the above object, a dielectric ceramic composition of the invention, includes: $Mg_2SiO_4$ as a main component; and an R-containing compound, a Cu-containing compound, a B-containing compound, and Li-containing glass, as a sub-component, in which R is an alkaline earth metal, the R-containing compound of greater than or equal to 0.2 part by mass and less than or equal to 4.0 parts by mass is contained in terms of RO, the Cu-containing compound of greater than or equal to 0.5 part by mass and less than or equal to 3.0 parts by mass is contained in terms of CuO, and the B-containing compound of greater than or equal to 0.2 part by mass and less than or equal to 3.0 parts by mass is contained in terms of $B_2O_3$, with respect to 100 parts by mass of the main component, and the Li-containing glass of greater than or equal to 2 parts by mass and less than or equal to 10 parts by mass is contained with respect to the total of 100 parts by mass of the main component and the sub-component excluding the Li-containing glass.

The dielectric ceramic composition is excellent in the Q value and the humidity resistance, is capable of low temperature sintering at a temperature of lower than or equal to 1000° C., and is capable of co-firing with Ag.

The dielectric ceramic composition of the invention may further contain a Mn-containing compound as the sub-component, in which the Mn-containing compound of greater than or equal to 0.05 part by mass and less than or equal to 1.5 parts by mass may be contained in terms of MnO with respect to 100 parts by mass of the main component.

The dielectric ceramic composition of the invention may further contain a Ti-containing compound as the sub-component, in which the Ti-containing compound of greater than or equal to 0.3 part by mass and less than or equal to 3.0 parts by mass may be contained in terms of $TiO_2$ with respect to 100 parts by mass of the main component.

The dielectric ceramic composition of the invention may further contain an Al-containing compound as the sub-component, in which the Al-containing compound of greater than or equal to 0.3 part by mass and less than or equal to 3.0 parts by mass may be contained in terms of $Al_2O_3$ with respect to 100 parts by mass of the main component.

The dielectric ceramic composition of the invention may further contain a Zr-containing compound as the sub-component, in which the Zr-containing compound of greater than or equal to 0.2 part by mass and less than or equal to 3.0 parts by mass may be contained in terms of $ZrO_2$ with respect to 100 parts by mass of the main component.

The dielectric ceramic composition of the invention may further contain Ag as the sub-component, in which Ag of greater than or equal to 0.05 part by mass and less than or equal to 1.0 part by mass may be contained with respect to the total of 100 parts by mass of the main component and the sub-component excluding the Li-containing glass.

An electronic component of the invention includes a dielectric layer formed of any one of the dielectric ceramic compositions described above.

DETAILED DESCRIPTION

Hereinafter, an embodiment for preferably carrying out the invention will be described.

A dielectric ceramic composition according to this embodiment contains a main component including $Mg_2SiO_4$, and a sub-component including an R-containing compound (R is an alkaline earth metal), a Cu-containing compound, a B-containing compound, and Li-containing glass.

Furthermore, in this embodiment, firing indicates a heating treatment for sintering, and a firing temperature is a temperature in an atmosphere where the dielectric ceramic composition is exposed during the heating treatment.

Dielectric properties of the dielectric ceramic composition according to this embodiment can be evaluated according to a Qf value of a sintered body, a resonance frequency change due to a temperature change (a temperature coefficient τf of a resonance frequency), and a relative dielectric constant εr. The Qf value and the relative dielectric constant εr can be measured according to Japanese Industrial Standards "Testing Method for Dielectric Properties of Fine Ceramics at Microwave Frequency" (JIS R1627, in 1996).

In the dielectric ceramic composition according to this embodiment, $Mg_2SiO_4$ (forsterite) is contained as the main component. $Mg_2SiO_4$ has a Qf value of greater than or equal to 200000 GHz in a single body and has a small dielectric loss, and thus, has a function of decreasing a dielectric loss of the dielectric ceramic composition. In addition, $Mg_2SiO_4$ has a low relative dielectric constant εr of approximately 6 to 7, and thus, also has a function of decreasing the relative dielectric constant εr of the dielectric ceramic composition. Here, the dielectric loss is a phenomenon in which a part of high frequency energy is diffused by heat. The dielectric loss is represented by an inverse number Q of tangent tan δ of a loss angle δ(Q=1/tan δ), which is a difference between a phase difference between the actual current and voltage, and a phase difference between the ideal current and voltage (90 degrees). The dielectric loss of the dielectric ceramic composition is evaluated by using the Qf value which is a product between the Q value and a resonance frequency f. In a case where the dielectric loss decreases, the Qf value increases, and in a case where the dielectric loss increases, the Qf value decreases. The dielectric loss indicates a power loss of a high frequency device, and thus, it is preferable that the Qf value of the dielectric ceramic composition is large. Here, in this embodiment, the resonance frequency f during a test is regarded as being approximately constant, and the dielectric loss is evaluated by using the Q value.

It is preferable that the main component substantially includes only $Mg_2SiO_4$ from the viewpoint of decreasing the dielectric loss of the dielectric ceramic composition. However, in order to adjust the relative dielectric constant εr, a main component other than $Mg_2SiO_4$ can be used along with $Mg_2SiO_4$. Examples of the main component other than $Mg_2SiO_4$ include magnesium titanate ($MgTiO_3$) of which the relative dielectric constant εr is approximately 17, calcium titanate ($CaTiO_3$) of which the relative dielectric constant εr is approximately 200, and the like. Furthermore, "the main component substantially includes only $Mg_2SiO_4$" indicates that the amount of $Mg_2SiO_4$ with respect to 100 parts by mass of the main component is greater than or equal to 95 parts by mass.

In a molar ratio of MgO to $SiO_2$ configuring $Mg_2SiO_4$, MgO to $SiO_2$ is stoichiometrically 2:1. However, in this embodiment, MgO to $SiO_2$ is not limited to 2:1, and may deviate from a stoichiometric proportion, within a range not impairing the effect of the dielectric ceramic composition according to this embodiment. For example, $MgO:SiO_2$ can be within a range of 1.9:1.1 to 2.1:0.9.

The dielectric ceramic composition according to this embodiment contains the R-containing compound (R is the alkaline earth metal), the Cu-containing compound, the B-containing compound, and the Li-containing glass as the sub-component with respect to $Mg_2SiO_4$ which is the main component. Furthermore, herein, Be and Mg are not included in the alkaline earth metal.

The dielectric ceramic composition of this embodiment contains the R-containing compound as the sub-component, and thus, low temperature sintering is easily performed. For example, an oxide, a carbonate, a nitrate, an oxalate, a hydroxide, a sulfide, an organic metal compound, or the like of R are exemplified as the R-containing compound. In addition, the amount of the R-containing compound in terms of RO is greater than or equal to 0.2 part by mass and less than or equal to 4.0 parts by mass and is preferably greater than or equal to 0.2 part by mass and less than or equal to 3.5 parts by mass with respect to 100 parts by mass of the main component. In a case where the amount of the R-containing compound excessively small, it is difficult to perform the low temperature sintering. In addition, a bending strength of the sintered body decreases. In a case where the amount of RO is excessively large, the Q value of the sintered body decreases.

Any one of Ba, Sr, and Ca is preferable as R which is the alkaline earth metal and two or more types thereof may be used by being mixed. In a case where Ca is contained as R, it is preferable that the amount of the Ca-containing compound is greater than or equal to 0.2 part by mass and less than or equal to 3.0 parts by mass in terms of CaO with respect to 100 parts by mass of the main component. In a case where Sr is contained as R, it is preferable that the amount of the Sr-containing compound is greater than or equal to 0.2 part by mass and less than or equal to 3.0 parts by mass in terms of SrO with respect to 100 parts by mass of the main component. In a case where Ba is contained as R, it is preferable that the amount of the Ba-containing compound is greater than or equal to 0.2 part by mass and less than or equal to 3.0 parts by mass in terms of BaO with respect to 100 parts by mass of the main component.

The dielectric ceramic composition of this embodiment contains the Cu-containing compound as the sub-component, and thus, the low temperature sintering is easily performed and the Q value of the sintered body is improved. For example, an oxide, a carbonate, a nitrate, an oxalate, a hydroxide, a sulfide, an organic metal compound, and the like of Cu are exemplified as the Cu-containing compound. In addition, the amount of the Cu-containing compound is greater than or equal to 0.5 part by mass and less than or equal to 3.0 parts by mass and is preferably greater than or equal to 0.5 part by mass and less than or equal to 2.5 parts by mass in terms of CuO with respect to 100 parts by mass of the main component. In a case where the amount of the Cu-containing compound is excessively small, it is difficult to perform the low temperature sintering. In a case where the amount of the Cu-containing compound is excessively large, the Q value of the sintered body decreases. Further, in the case of using an Ag internal electrode, Ag is diffused to the dielectric ceramic composition during the firing. As a result, a gap is generated between a dielectric body and an electrode, adhesiveness decreases, and humidity resistance decreases.

The dielectric ceramic composition of this embodiment contains the B-containing compound as the sub-component, and thus, the low temperature sintering is easily performed and the Q value of the sintered body is improved. For example, an oxide, a carbonate, a nitrate, an oxalate, a hydroxide, a sulfide, an organic metal compound, and the like of B are exemplified as the B-containing compound. In addition, the amount of the B-containing compound is greater than or equal to 0.2 part by mass and less than or equal to 3.0 parts by mass and is preferably greater than or equal to 0.2 part by mass and less than or equal to 2.5 parts by mass in terms of $B_2O_3$ with respect to 100 parts by mass of the main component. In a case where the amount of the B-containing compound is excessively small, it is difficult to perform the low temperature sintering. In a case where the amount of the B-containing compound is excessively large, the Q value decreases. Further, in the case of using the Ag internal electrode, Ag is diffused to the dielectric ceramic composition during the firing. As a result thereof, a gap is generated between the dielectric body and the electrode, the adhesiveness decreases, and the humidity resistance decreases.

The dielectric ceramic composition of this embodiment contains the Li-containing glass as the sub-component, and thus, the low temperature sintering is easily performed and the Q value of the sintered body is improved. Further, chemical stability and insulation reliability of the sintered body are also improved.

For example, one or both of $SiO_2$—RO—$Li_2O$-based glass (RO is an alkaline earth metal oxide) and $B_2O_3$—RO—$Li_2O$-based glass are preferable as the Li-containing glass. $SiO_2$—CaO—$Li_2O$-based glass, $SiO_2$—SrO—$Li_2O$- based glass, $SiO_2$—BaO—$Li_2O$-based glass, $SiO_2$—CaO—SrO—$Li_2O$-based glass, $SiO_2$—BaO—CaO—$Li_2O$-based glass, $SiO_2$—SrO—BaO—$Li_2O$-based glass, $SiO_2$—CaO—SrO—BaO—$Li_2O$-based glass, and the like are exemplified as a glass component specifically as the $SiO_2$—RO—$Li_2O$-based glass. $B_2O_3$—CaO—$Li_2O$-based glass, $B_2O_3$—SrO—$Li_2O$-based glass, $B_2O_3$—BaO—$Li_2O$-based glass, $B_2O_3$—CaO—SrO—$Li_2O$-based glass, $B_2O_3$—BaO—CaO—$Li_2O$-based glass, $B_2O_3$—SrO—BaO—$Li_2O$-based glass, $B_2O_3$—CaO—SrO—BaO—$Li_2O$-based glass, and the like are exemplified as a glass component specifically as the $B_2O_3$—RO—$Li_2O$-based glass. Among them, the $SiO_2$—BaO—CaO—$Li_2O$-based glass is preferable.

In a case where the $SiO_2$—BaO—CaO—$Li_2O$-based glass is used as the Li-containing glass, it is preferable that the amount of $SiO_2$ is greater than or equal to 25 parts by mass and less than or equal to 45 parts by mass, the amount of BaO is greater than or equal to 20 parts by mass and less than or equal to 40 parts by mass, the amount of CaO is greater than or equal to 10 parts by mass and less than or equal to 30 parts by mass, and the amount of $Li_2O$ is greater than or equal to 10 parts by mass and less than or equal to 30 parts by mass, $Li_2O$ being a substantial remaining part of the Li-containing glass, with respect to 100 parts by mass of the entire $SiO_2$—BaO—CaO—$Li_2O$-based glass. The amount of $SiO_2$ is set to be greater than or equal to 25 parts by mass, and thus, the chemical stability of the sintered body is easily improved. The amount of $SiO_2$ is set to be less than or equal to 45 parts by mass, and thus, the low temperature sintering is easily performed. The amount of BaO is set to be greater than or equal to 20 parts by mass, and thus, the insulation reliability of the sintered body is improved. The amount of BaO is set to be less than or equal to 40 parts by mass, and thus, the insulation reliability and the Q value of the sintered body are improved. The amount of CaO is set to be greater than or equal to 10 parts by mass, and thus, the insulation reliability of the sintered body is improved. The amount of CaO is set to be less than or equal to 30 parts by mass, and thus, the insulation reliability and the Q value of the sintered body are improved. Furthermore, the fact that $Li_2O$ is the substantial remaining part of the Li-containing glass indicates that the total amount of $SiO_2$, BaO, CaO and $Li_2O$ is greater than or equal to 95 parts by mass with respect to 100 parts by mass of the entire $SiO_2$—BaO—CaO—$Li_2O$-based glass. Furthermore, unless otherwise noted, the amount of the components contained in the Li-containing glass, is not included in the amount of the sub-component other than the Li-containing glass.

In addition, the Li-containing glass may contain $Al_2O_3$. For example, one or both of $SiO_2$—RO—$Al_2O_3$—$Li_2O$-based glass (RO is an alkaline earth metal oxide) and $B_2O_3$—RO—$Al_2O_3$—$Li_2O$-based glass are preferable as Li-containing glass containing $Al_2O_3$. $SiO_2$—CaO—$Al_2O_3$—$Li_2O$-based glass, $SiO_2$—SrO—$Al_2O_3$—$Li_2O$-based glass, $SiO_2$—BaO—$Al_2O_3$—$Li_2O$-based glass, $SiO_2$—CaO—SrO—$Al_2O_3$—$Li_2O$-based glass, $SiO_2$—BaO—CaO—$Al_2O_3$—$Li_2O$-based glass, $SiO_2$—SrO—BaO—$Al_2O_3$—$Li_2O$-based glass, $SiO_2$—CaO—SrO—BaO—$Al_2O_3$—$Li_2O$-based glass, and the like are exemplified as a glass component, specifically, as the $SiO_2$—RO—$Al_2O_3$—$Li_2O$-based glass. $B_2O_3$—CaO—$Al_2O_3$—$Li_2O$-based glass, $B_2O_3$—SrO—$Al_2O_3$—$Li_2O$-based glass, $B_2O_3$—BaO—$Al_2O_3$—$Li_2O$-based glass, $B_2O_3$—CaO—SrO—$Al_2O_3$—$Li_2O$-based glass, $B_2O_3$—BaO—CaO—$Al_2O_3$—$Li_2O$-based glass, $B_2O_3$—SrO—BaO—$Al_2O_3$—$Li_2O$-based glass, $B_2O_3$—CaO—SrO—BaO—$Al_2O_3$—$Li_2O$-based glass, and the like are exemplified as the $B_2O_3$—RO—$Al_2O_3$—$Li_2O$-based glass. Among them, the $SiO_2$—BaO—CaO—$Al_2O_3$—$Li_2O$-based glass is preferable.

In a case where the $SiO_2$—BaO—CaO—$Al_2O_3$—$Li_2O$-based glass is used as the Li-containing glass, it is preferable that the amount of $SiO_2$ is greater than or equal to 25 parts by mass and less than or equal to 45 parts by mass, the amount of BaO is greater than or equal to 20 parts by mass and less than or equal to 40 parts by mass, the amount of CaO is greater than or equal to 10 parts by mass and less than or equal to 30 parts by mass, the amount of $Al_2O_3$ is greater than or equal to 1 part by mass and less than or equal to 10 parts by mass, and the amount of $Li_2O$ is greater than or equal to 10 parts by mass and less than or equal to 30 parts by mass, $Li_2O$ being a substantial remaining part of the Li-containing glass, with respect to 100 parts by mass of the entire $SiO_2$—BaO—CaO—$Al_2O_3$—$Li_2O$-based glass. The amount of $SiO_2$ is set to be greater than or equal to 25 parts by mass, and thus, the chemical stability of the sintered body is easily improved. The amount of $SiO_2$ is set to be less than or equal to 45 parts by mass, and thus, the low temperature sintering is easily performed. The amount of BaO is set to be greater than or equal to 20 parts by mass, and thus, the insulation reliability of the sintered body is improved. The amount of BaO is set to be less than or equal to 40 parts by mass, and thus, the insulation reliability and the Q value of the sintered body are improved. The amount of CaO is set to be greater than or equal to 10 parts by mass, and thus, the insulation reliability of the sintered body is improved. The amount of CaO is set to be less than or equal to 30 parts by mass, and thus, the insulation reliability and the Q value of the sintered body are improved. The amount of $Al_2O_3$ is set to be greater than or equal to 1 part by mass, and thus, the chemical stability of the sintered body is easily improved. The amount of $Al_2O_3$ is set to be less than or equal to 10 parts by mass, and thus, the low temperature sintering is easily performed. Furthermore, the fact that $Li_2O$ is the substantial remaining part of the Li-containing glass indicates that the total amount of $SiO_2$, BaO, CaO, $Al_2O_3$, and $Li_2O$ is greater than or equal to 95 parts by mass with respect to 100 parts by mass of the entire $SiO_2$—BaO—CaO—$Al_2O_3$—$Li_2O$-based glass.

The amount of the Li-containing glass is greater than or equal to 2.0 parts by mass and less than or equal to 10.0 parts by mass and is preferably greater than or equal to 2.0 parts by mass and less than or equal to 7.0 parts by mass with respect to the total of 100 parts by mass of the main component and the sub-component excluding the Li-containing glass. In a case where the amount of the Li-containing glass is excessively small, it is difficult to perform the low temperature sintering. In a case where the amount of the Li-containing glass is excessively large, the Q value decreases and the dielectric loss increases.

Further, it is preferable that the dielectric ceramic composition of this embodiment contains a Mn-containing compound as the sub-component. For example, an oxide, a carbonate, a nitrate, an oxalate, a hydroxide, a sulfide, an organic metal compound, and the like of Mn are exemplified as the Mn-containing compound. The amount of the Mn-containing compound is preferably greater than or equal to 0.05 part by mass and less than or equal to 1.5 parts by mass and is more preferably greater than or equal to 0.05 part by mass and less than or equal to 1.0 part by mass in terms of MnO with respect to 100 parts by mass of the main component. The Mn-containing compound of greater than or equal to 0.05 part by mass is contained in terms of the oxide, and thus, the low temperature sintering is easily performed and the Q value of the sintered body is improved. In addition, the amount of the Mn-containing compound is set to be less than or equal to 1.5 parts by mass in terms of the oxide, and thus, the diffusion of Ag with respect to the dielectric body during the sintering is easily suppressed in the case of using the Ag internal electrode.

Further, it is preferable that the dielectric ceramic composition of this embodiment contains a Ti-containing compound as the sub-component. For example, an oxide, a carbonate, a nitrate, an oxalate, a hydroxide, a sulfide, an organic metal compound, and the like of Ti are exemplified as the Ti-containing compound. The amount of the Ti-containing compound is preferably greater than or equal to 0.3 part by mass and less than or equal to 3.0 parts by mass and is more preferably greater than or equal to 0.3 part by mass and less than or equal to 2.0 parts by mass in terms of $TiO_2$ with respect to 100 parts by mass of the main component. The Ti-containing compound of greater than or equal to 0.3 part by mass is contained in terms of the oxide, and thus, the humidity resistance of the sintered body is improved. Further, in the case of using the Ag internal electrode, the diffusion of Ag with respect to the dielectric body during the sintering can be suppressed. The Ti-containing compound is contained, and thus, crystalline properties of the Li-containing glass can be improved. Therefore, the effects described above are expected to be obtained. In addition, the amount of the Ti-containing compound is set to be less than or equal to 3.0 parts by mass in terms of the oxide, and thus, the low temperature sintering is easily performed.

Further, it is preferable that the dielectric ceramic composition of this embodiment contains an Al-containing compound as the sub-component. For example, an oxide, a carbonate, a nitrate, an oxalate, a hydroxide, a sulfide, an organic metal compound, and the like of Al are exemplified as the Al-containing compound. The amount of the Al-containing compound is preferably greater than or equal to 0.3 part by mass and less than or equal to 3.0 parts by mass and is more preferably greater than or equal to 0.3 part by mass and less than or equal to 2.0 parts by mass in terms of $Al_2O_3$ with respect to 100 parts by mass of the main component. The Al-containing compound of greater than or equal to 0.3 part by mass is contained in terms of the oxide, and thus, the humidity resistance of the sintered body is improved. Further, in the case of using the Ag internal electrode, the diffusion of Ag with respect to the dielectric body during the sintering can be suppressed. The amount of the Al-containing compound is set to be less than or equal to 3.0 parts by mass in terms of the oxide, and thus, the low temperature sintering is easily performed.

Further, it is preferable that the dielectric ceramic composition of this embodiment contains a Zr-containing compound as the sub-component. For example, an oxide, a carbonate, a nitrate, an oxalate, a hydroxide, a sulfide, an organic metal compound, and the like of Zr are exemplified as the Zr-containing compound. The amount of the Zr-containing compound is preferably greater than or equal to 0.2 part by mass and less than or equal to 3.0 parts by mass and is more preferably greater than or equal to 0.2 part by mass and less than or equal to 2.0 parts by mass in terms of $ZrO_2$ with respect to 100 parts by mass of the main component. The Zr-containing compound of greater than or equal to 0.2 part by mass is contained in terms of the oxide, and thus, the Q value of the sintered body is improved. The Zr-containing compound is contained, and thus, the crystalline properties of the Li-containing glass can be improved. Therefore, the effects described above are expected to be obtained. In addition, the amount of the Zr-containing compound is set to be less than or equal to 3.0 parts by mass in terms of the oxide, and thus, the low temperature sintering is easily performed.

Further, the dielectric ceramic composition of this embodiment may contain Ag in advance as the sub-component in the case of using the Ag internal electrode. Ag is contained in the dielectric body, and thus, the diffusion of Ag in the Ag internal electrode with respect to the dielectric body (a dielectric body between the Ag electrodes) during the sintering is easily suppressed. In the case of containing Ag, it is preferable that the amount of Ag is greater than or equal to 0.05 part by mass and less than or equal to 1.0 part by mass with respect to the total of 100 parts by mass of the main component and the sub-component excluding the Li-containing glass. Ag of greater than or equal to 0.05 part by mass is contained, and thus, the diffusion of Ag in the Ag internal electrode with respect to the dielectric body during the sintering is easily suppressed in the case of using the Ag internal electrode. The amount of Ag is set to be less than or equal to 1.0 part by mass, and thus, the Q value of the sintered body can be maintained to be excellent. Here, it is preferable that the amount of Ag is greater than or equal to 0 part by mass and less than or equal to 0.05 part by mass, from the viewpoint of further improving the Q value.

Furthermore, the dielectric ceramic composition of this embodiment may contain a sub-component other than the sub-component described above, and it is preferable that a Zn-containing compound is not substantially contained. For example, an oxide, a carbonate, a nitrate, an oxalate, a hydroxide, a sulfide, an organic metal compound, and the like of Zn are exemplified as the Zn-containing compound. The fact that the Zn-containing compound is not substantially contained, indicates that in a case where the sintered body after the firing is subjected to XRD measurement, a peak of ZnO is not observed, and a peak of a compound formed of forsterite and ZnO, a peak of a compound formed of Li-containing glass and ZnO, and a peak of a compound formed of each of the sub-components and ZnO, are not also observed. In addition, in this case, the amount of the Zn-containing compound is approximately less than 0.05 part by mass in terms of ZnO with respect to the total of 100 parts by mass of the main component. The Zn-containing compound is not substantially contained, and thus, the Q value and the humidity resistance of the sintered body are improved. Further, in the case of using the Ag internal electrode, the diffusion of Ag with respect to the dielectric body during the sintering is suppressed.

In addition, in the dielectric ceramic composition of this embodiment, the total amount of the sub-component other than the sub-component described above is not particularly limited, and the sub-component other than the sub-component described above may be contained in a range not impairing the effects of the invention. For example, the sub-component of less than or equal to 5 parts by mass may be contained in terms of the oxide with respect to 100 parts by mass of the entire dielectric ceramic composition.

Hereinafter, an example of a manufacturing method of the dielectric ceramic composition according to this embodiment and the sintered body will be described. The manufacturing method of the dielectric ceramic composition according to this embodiment and the sintered body includes the following steps:

(a) A $Mg_2SiO_4$ crystal powder preparing step of preparing a $Mg_2SiO_4$ crystal powder by mixing a raw material powder of magnesium oxide with a raw material powder of silicon dioxide, and by performing a heat treatment with respect to the mixture;

(b) A dielectric ceramic composition preparing step of obtaining a dielectric ceramic composition by adding an sub-component raw material powder to the $Mg_2SiO_4$ crystal powder; and (c) A firing step of obtaining a sintered body of the dielectric ceramic composition by firing the dielectric ceramic composition at a temperature of higher than or equal to 800° C. and lower than or equal to 1000° C., under an oxygen atmosphere.

<$Mg_2SiO_4$ Crystal Powder Preparing Step>

The $Mg_2SiO_4$ crystal powder preparing step is a step of preparing the forsterite ($Mg_2SiO_4$) crystal powder by mixing the raw material powder of the magnesium oxide (MgO) with the raw material powder of the silicon oxide ($SiO_2$), and by performing calcining with respect to the mixture. The raw material powder of MgO and the raw material powder of $SiO_2$, which are a raw material of the $Mg_2SiO_4$ crystal powder, are respectively weighted by a predetermined amount, and are mixed with each other. Accordingly, a raw material mixed powder is obtained. In addition, the raw material powder of MgO and the raw material powder of $SiO_2$ can be mixed by a mixing method such as dry mixing or a wet mixing, and for example, are mixed by using a solvent such as pure water and ethanol, in a mixing disperser such as a ball mill. In the case of the ball mill, a mixing time is approximately 4 hours to 24 hours.

The raw material mixed powder is dried at a temperature of preferably higher than or equal to 100° C. and lower than or equal to 200° C. and of more preferably higher than or equal to 120° C. and lower than or equal to 140° C. for approximately 12 hours to 36 hours, and then, is subjected to the heat treatment (the calcining). According to the calcining, $Mg_2SiO_4$ crystals are obtained. A calcining temperature is preferably higher than or equal to 1100° C. and lower than or equal to 1500° C. and is more preferably higher than or equal to 1100° C. and lower than or equal to 1350° C. In addition, it is preferable that a calcining time is approximately 1 hour to 24 hours.

The synthesized $Mg_2SiO_4$ crystals are pulverized to be a powder, and then, are dried. Accordingly, the $Mg_2SiO_4$ crystal powder is obtained. The $Mg_2SiO_4$ crystal powder is used as a main component powder of the dielectric ceramic composition. The pulverization can be performed by a pulverization method such as dry pulverization or wet pulverization, and for example, the wet pulverization can be performed by using a solvent such as pure water and ethanol, in a ball mill. A pulverization time is not particularly limited, but may be a time when the $Mg_2SiO_4$ crystal powder having a desired average grain size can be obtained, and for example, the pulverization time may be approximately 4 hours to 24 hours. The $Mg_2SiO_4$ crystal powder is dried at a dry temperature of preferably higher than or equal to 100° C. and lower than or equal to 200° C. and of more preferably higher than or equal to 120° C. and lower than or equal to 140° C. for approximately longer than or equal to 12 hours and shorter than or equal to 36 hours.

Furthermore, in order to increase the effect by including the $Mg_2SiO_4$ crystals, it is necessary to reduce the raw material component of unreacted MgO or $SiO_2$ contained in $Mg_2SiO_4$, and thus, when the raw material mixed powder in which MgO and $SiO_2$ are mixed together, is prepared, it is preferable that MgO and $SiO_2$ are mixed together such that a molar number of magnesium is two times a molar number of silicon.

The $Mg_2SiO_4$ crystal powder is not limited to the $Mg_2SiO_4$ crystal powder obtained by a method of synthesizing the $Mg_2SiO_4$ crystals from the raw material powder of MgO and the raw material powder of $SiO_2$, and commercially available $Mg_2SiO_4$ may be used. In this case, the commercially available $Mg_2SiO_4$ may be pulverized and may be dried by the same method as described above, and thus, the $Mg_2SiO_4$ crystal powder may be obtained.

The $Mg_2SiO_4$ crystal powder is obtained, and then, the process proceeds to the dielectric ceramic composition preparing step.

<Dielectric Ceramic Composition Preparing Step>

The dielectric ceramic composition preparing step is a step of obtaining the dielectric ceramic composition by adding the sub-component raw material powder to the $Mg_2SiO_4$ crystal powder.

The obtained $Mg_2SiO_4$ crystal powder, the R-containing compound, the B-containing compound, the Cu-containing compound and the like are weighed by a predetermined amount, and then, are mixed, and are subjected to the heat treatment. The R-containing compound, the B-containing compound, the Cu-containing compound and the like are the raw material of the sub-component of the dielectric ceramic composition. Furthermore, the sub-component may be added as the impurities of the $Mg_2SiO_4$ crystal powder. Furthermore, each of the raw materials of the sub-component is weighed such that the amount (parts by mass) of each of the sub-components in the dielectric ceramic composition becomes a desired value. The Li-containing glass is added to the powder after being subjected to the heat treatment and a pulverization treatment is performed, and thus, the dielectric ceramic composition is obtained. In this embodiment, the Li-containing glass is added to a powder which is obtained by mixing the $Mg_2SiO_4$ crystal powder with the raw material of the sub-component, and then, by performing the heat treatment with respect to the mixture, but an adding time of the Li-containing glass is not limited thereto. The Li-containing glass, for example, may be added in a step where the $Mg_2SiO_4$ crystal powder and the raw material of the sub-component are mixed together (a step before the heat treatment).

A compound which becomes an oxide by being fired in the heat treatment such as the calcining described below can be used as the raw material of the sub-component. For example, a carbonate, a nitrate, an oxalate, a hydroxide, a sulfide, an organic metal compound, and the like are exemplified as the compound which becomes the oxide described above by the firing.

Each of the raw materials is weighed such that the amount of each of the sub-components in the dielectric ceramic composition after being completed becomes the desired mass ratio (parts by mass) described above with respect to the main component.

The mixing can be performed by a mixing method such as dry mixing or wet mixing, and for example, can be performed by a mixing method using a solvent such as pure water and ethanol in a mixing disperser such as a ball mill. A mixing time may be approximately longer than or equal to 4 hours and shorter than or equal to 24 hours.

The raw material mixed powder is dried at a dry temperature of preferably higher than or equal to 100° C. and lower than or equal to 200° C. and of more preferably higher than or equal to 120° C. and lower than or equal to 140° C. for approximately longer than or equal to 12 hours and shorter than or equal to 36 hours.

The dried raw material mixed powder, for example, is subjected to the heat treatment (the calcining) at a temperature of higher than or equal to 700° C. and lower than or equal to 850° C., for approximately longer than or equal to 1 hour and shorter than or equal to 10 hours. The calcining is performed at a temperature lower than or equal to the firing temperature, and thus, it is possible to suppress the forsterite in the raw material mixed powder from being fused and to contain $Mg_2SiO_4$ in the dielectric ceramic composition in the form of a crystal.

The Li-containing glass is added to the raw material mixed powder after being calcined, mixing pulverization is performed, and then, drying is performed. Accordingly, the dielectric ceramic composition is obtained. The pulverization can be performed by a pulverization method such as dry pulverization or wet pulverization. A pulverization time may be approximately longer than or equal to 4 hours and shorter than or equal to 24 hours. The raw material mixed powder after being pulverized, may be dried, at a treatment temperature of preferably higher than or equal to 80° C. and lower than or equal to 200° C. and of more preferably higher than or equal to 100° C. and lower than or equal to 140° C. for approximately longer than or equal to 12 hours and shorter than or equal to 36 hours.

According to the preparing method of the raw material mixed powder which is the dielectric powder, described above, the main component and the sub-component of the dielectric ceramic composition are uniformly mixed, and thus, it is possible to obtain a dielectric ceramic composition with a uniform material.

The dielectric ceramic composition is obtained, and then, the process proceeds to the firing step of firing the dielectric ceramic composition.

<Firing Step>

In the firing step, the obtained dielectric ceramic composition is fired, and thus, the sintered body is obtained. It is preferable that the firing, for example, is performed in an oxygen atmosphere such as in the air. In addition, it is preferable that the firing temperature is lower than or equal to a melting point of an Ag-based metal which is used as a conductive material (an internal electrode). For example, the firing temperature is preferably higher than or equal to 800° C. and lower than or equal to 1000° C., and is more preferably higher than or equal to 800° C. and lower than or equal to 950° C.

Thus, the dielectric ceramic composition which is obtained by using the manufacturing method of the dielectric ceramic composition according to this embodiment is capable of sufficiently increasing a relative density of dielectric ceramics even in the case of being fired at a low temperature of higher than or equal to 800° C. and lower than or equal to 1000° C. Therefore, the dielectric ceramic composition according to this embodiment becomes a dielectric ceramic composition in which the firing can be performed at a low temperature in the firing step, sintering properties of the dielectric ceramic composition are ensured, the bending strength is maintained, and the Q value is excellent. Therefore, it is possible to preferably use the dielectric ceramic composition according to this embodiment, as a dielectric layer configuring a part of an electronic component such as a filter, a resonator, a capacitor, and a circuit substrate.

As described above, a preferred embodiment of the dielectric ceramic composition according to the invention has been described, but it is not necessary that the invention is limited to the embodiment described above. For example, other compounds may be contained in the dielectric ceramic composition according to the invention, within a range not impairing the effect of ensuring the sintering properties while enabling the firing to be performed at a low temperature, of maintaining the bending strength of the sintered body, and of decreasing a dielectric loss of the sintered body.

EXAMPLES

Hereinafter, the invention will be described in more detail by using examples and comparative examples, but the invention is not limited to the following examples.

Examples 1 to 18

<Preparation of Dielectric Ceramic Composition>

First, MgO and $SiO_2$, which are the raw material of the main component $Mg_2SiO_4$, were respectively weighed such that the molar number of Mg is two times the molar number of Si. Pure water was added to the weighed MgO and $SiO_2$, and thus, slurry was prepared. The total amount of MgO and $SiO_2$ with respect to 100 parts by mass of the entire slurry, was set to 25 parts by mass. The slurry was subjected to wet mixing for 16 hours in a ball mill, and then, was dried at 120° C. for 24 hours, and thus, the mixed powder of MgO and $SiO_2$ was obtained. The mixed powder was calcined at 1200° C. for 3 hours in the air, and thus, the $Mg_2SiO_4$ crystals were obtained. Pure water was added again to the $Mg_2SiO_4$ powder, and thus, slurry was prepared. The amount of the $Mg_2SiO_4$ powder with respect to 100 parts by mass of the entire slurry was set to 25 parts by mass. The slurry was pulverized for 16 hours in a ball mill, and then, was dried at 120° C. for 24 hours, and thus, the $Mg_2SiO_4$ crystal powder was prepared.

Next, CuO, $B_2O_3$, $CaCO_3$, $MnCO_3$, $TiO_2$, $Al_2O_3$, Ag, and the Li-containing glass were added to the obtained $Mg_2SiO_4$ crystal powder. Each of the sub-components other than Ag and the Li-containing glass was added by the amount in terms of the oxide shown in Table 1, with respect to 100 parts by mass of the main component. Furthermore, $CaCO_3$ and $MnCO_3$ described above are changed to CaO and MnO during the firing described below. Ag and the Li-containing glass were added by the amount shown in Table 1, with respect to the total of 100 parts by mass of the main component and the sub-component excluding the Li-containing glass in terms of the oxide. In addition, $SiO_2$—BaO—CaO—$Li_2O$-based glass was used as the Li-containing glass. In addition, in the composition of the Li-containing glass, $SiO_2$ was set to 35 parts by mass, BaO was set to 29 parts by mass, CaO was set to 19 parts by mass, and $Li_2O$ was set to 17 parts by mass, with respect to 100 parts by mass of the entire Li-containing glass.

Further, as an organic binder, 10 mass % of poly(ethyl methacrylate) which is an acrylic resin was added to the mixture described above, and then, sheet molding was performed by a doctor blade method, and thus, a plurality of sheet molded bodies were prepared. The plurality of sheet molded bodies were pressed after being laminated, and were molded into the shape of a substrate, and thus, a sheet laminated molded body was prepared. The sheet laminated molded body was cut to have a desired size, and thus, a chip was obtained. The chip was chamfered, and then, was fired at a firing temperature of 900° C. for 2 hours, and thus, the sintered body of the dielectric ceramic composition was prepared. A mixed amount of the organic binder was suitably changed according to the composition of each of the examples and the comparative examples.

In each of the examples and the comparative examples, the obtained sintered density, the Q value, the humidity resistance, and an Ag diffusion concentration with respect to the dielectric body between the Ag electrodes were measured. Furthermore, in all of the examples and the comparative examples, it was confirmed that the Zn-containing compound was not substantially contained, according to the XRD measurement.

<Sintered Density>

A test piece after being fired was subjected to a cutting process to have a size of approximately 4.5 mm×3.2 mm×0.8 mm, and a dimension in each direction was precisely measured by a micrometer. In addition, the mass of the test piece after the cutting process was measured by an electronic balance and the mass of the test piece after the cutting process was divided by the volume of the test piece after the cutting process, and thus, the sintered density was measured. In this example, a case where the sintered density was greater than or equal to 3.1 g/cm$^3$, it was evaluated as being excellent. Furthermore, a test piece of which the sintered density was not excellent was insufficiently sintered, and thus, the following evaluation items were not capable of being measured.

<Q Value>

The Q value of the sintered body was measured according to Japanese Industrial Standards "Testing Method for Dielectric Properties of Fine Ceramics at Microwave Frequency" (JIS R1627, in 1996). Specifically, a column of 10 mm$\phi$×5 mm was prepared, dielectric tangent tan δ was calculated by a both ends short-circuited dielectric resonator method, and tan δ=Q was obtained. In the case of Q≥1500, it was evaluated that the Q value was excellent. It is more preferable that Q≥1800 is obtained.

<Humidity Resistance>

An Ag electrode paste was applied onto the sheet molded body described above by a thickness of 2 µm. After that, eleven sheet molded bodies on which the Ag electrode paste was applied were superimposed such that conductive paste film were alternately drawn out to an end portion, and thus, a plurality of sheet molded bodies on which the Ag electrode paste was not applied were superimposed up and down, and were adhered by pressure, and thus, a laminated body of ten layers was prepared. The laminated body was cut into a desired shape, and a green chip was obtained, was chamfered, and was fired at a firing temperature of 900° C. for 2 hours, and thus, a capacitor element having a width of 3.2 mm, a length of 4.5 mm, and a thickness of 0.8 mm, was obtained. Further, end surface polishing was performed by barrel polishing and a paste for an external electrode was applied and fired, and thus, a laminated ceramic capacitor for evaluation was prepared.

The humidity resistance was evaluated by measuring IR after a pressure cooker test (PCT) with respect to the laminated ceramic capacitor prepared as described above by using the sheet molded body of each of the examples and the comparative examples. The PCT was performed at 121° C., 2 atm, and 95% rh for 96 hours. After that, a voltage of 50 V was applied, and thus, the IR was measured. In a case where the IR after the PCT was greater than or equal to 1.00 E+9 Ω·cm, it was evaluated as being excellent.

<Ag Diffusion Concentration with Respect to Dielectric Body between Ag Electrodes>

The Ag diffusion concentration with respect to the dielectric body between the Ag electrodes was evaluated by performing polishing with respect to the laminated ceramic capacitor described above from a width direction to the vicinity of the center of the chip and by measuring thirty arbitrary dielectric portions interposed between the Ag electrodes with an electron prove microanalyzer (EPMA: JXA-8500 manufactured by JEOL Ltd.). The measurement was performed in the condition of an accelerating voltage of 10 kV, an irradiation current of 0.2 µA, a beam diameter of 5 µm$\phi$, a measurement time Ag peak of 10 seconds and a back of 5 seconds, and thus, the average concentration of Ag diffused in the dielectric body was quantified. In a case where the Ag concentration was less than or equal to 0.3 wt %, it was evaluated that the diffusion suppression of Ag was excellent.

Examples 19 to 22

In Examples 19 to 22, the chip was prepared by the same method as that of Example 16 except that SiO$_2$—BaO—CaO—Al$_2$O$_3$—Li$_2$O-based glass was used as the Li-containing glass, and ZrO$_2$ was added to the obtained Mg$_2$SiO$_4$ crystal powder, as necessary, and the sintered density, the Q value, the humidity resistance, and the Ag diffusion concentration with respect to the dielectric body between the Ag electrodes were measured.

Furthermore, in the SiO$_2$—BaO—CaO—Al$_2$O$_3$—Li$_2$O-based Li-containing glass used in Examples 19 to 22, SiO$_2$ was set to 33 parts by mass, BaO was set to 28 parts by mass, CaO was set to 18 parts by mass, Al$_2$O$_3$ was set to 5 parts by mass, and Li$_2$O was set to 16 parts by mass, with respect to 100 parts by mass of the entire Li-containing glass.

TABLE 1

| | Sub-Component (Parts by Mass with respect to 100 Parts by Mass of Main Component) | | | | | | | | | | | Sub-Component (Parts by Mass with respect to Total of 100 Parts by Mass of Main Component and Sub-Component Excluding Li-Containing Glass) | | Sintered Density | Evaluation | | | |
|---|---|---|---|---|---|---|---|---|---|---|---|---|---|---|---|---|---|---|
| | CuO | B₂O₃ | CaO | SrO | BaO | CaO + SrO + BaO | MnO | TiO₂ | Al₂O₃ | ZrO₂ | Ag | Li-Containing Glass SiO₂—BaO—CaO—Li₂O-Based | Li-Containing Glass Al₂O₃—SiO₂—BaO—Li₂O-Based | (g/cm³) | Q Value | IR after PCT (Ω-cm) | Ag Concentration (wt %) | |
| Comparative Example 2 | 1.5 | 1.0 | 0.6 | 1.0 | 0.0 | 1.6 | 0.0 | 0.0 | 0.0 | 0.0 | 0.0 | 1.0 | 0.0 | 2.8 | Immeasurable due to Insufficient Sintering | | | |
| Example 3 | 1.5 | 1.0 | 0.6 | 1.0 | 0.0 | 1.6 | 0.0 | 0.0 | 0.0 | 0.0 | 0.0 | 2.0 | 0.0 | 3.1 | 1800 | 5.0E+10 | 0.15 | |
| Example 1 | 1.5 | 1.0 | 0.6 | 1.0 | 0.0 | 1.6 | 0.0 | 0.0 | 0.0 | 0.0 | 0.0 | 5.0 | 0.0 | 3.1 | 2000 | 5.0E+10 | 0.20 | |
| Example 1a | 1.5 | 1.0 | 0.6 | 1.0 | 0.0 | 1.6 | 0.0 | 0.0 | 0.0 | 0.0 | 0.0 | 7.0 | 0.0 | 3.2 | 1800 | 5.0E+10 | 0.23 | |
| Example 2 | 1.5 | 1.0 | 0.6 | 1.0 | 0.0 | 1.6 | 0.0 | 0.0 | 0.0 | 0.0 | 0.0 | 10.0 | 0.0 | 3.2 | 1500 | 5.0E+10 | 0.25 | |
| Comparative Example 1 | 1.5 | 1.0 | 0.6 | 1.0 | 0.0 | 1.6 | 0.0 | 0.0 | 0.0 | 0.0 | 0.0 | 11.0 | 0.0 | 3.2 | 1400 | 1.0E+10 | 0.25 | |
| Comparative Example 5 | 0.4 | 1.0 | 0.6 | 1.0 | 0.0 | 1.6 | 0.0 | 0.0 | 0.0 | 0.0 | 0.0 | 5.0 | 0.0 | 2.9 | Immeasurable due to Insufficient Sintering | | | |
| Example 4 | 0.5 | 1.0 | 0.6 | 1.0 | 0.0 | 1.6 | 0.0 | 0.0 | 0.0 | 0.0 | 0.0 | 5.0 | 0.0 | 3.1 | 2000 | 5.0E+10 | 0.15 | |
| Example 1 | 1.5 | 1.0 | 0.6 | 1.0 | 0.0 | 1.6 | 0.0 | 0.0 | 0.0 | 0.0 | 0.0 | 5.0 | 0.0 | 3.1 | 2000 | 5.0E+10 | 0.20 | |
| Example 5a | 2.5 | 1.0 | 0.6 | 1.0 | 0.0 | 1.6 | 0.0 | 0.0 | 0.0 | 0.0 | 0.0 | 5.0 | 0.0 | 3.1 | 1800 | 1.0E+10 | 0.25 | |
| Example 5 | 3.0 | 1.0 | 0.6 | 1.0 | 0.0 | 1.6 | 0.0 | 0.0 | 0.0 | 0.0 | 0.0 | 5.0 | 0.0 | 3.2 | 1500 | 5.0E+09 | 0.29 | |
| Comparative Example 6 | 3.1 | 1.0 | 0.6 | 1.0 | 0.0 | 1.6 | 0.0 | 0.0 | 0.0 | 0.0 | 0.0 | 5.0 | 0.0 | 3.2 | 1400 | 1.0E+08 | 0.32 | |
| Comparative Example 7 | 1.5 | 0.1 | 0.6 | 1.0 | 0.0 | 1.6 | 0.0 | 0.0 | 0.0 | 0.0 | 0.0 | 5.0 | 0.0 | 2.7 | Immeasurable due to Insufficient Sintering | | | |
| Example 6 | 1.5 | 0.2 | 0.6 | 1.0 | 0.0 | 1.6 | 0.0 | 0.0 | 0.0 | 0.0 | 0.0 | 5.0 | 0.0 | 3.1 | 2200 | 5.0E+10 | 0.15 | |
| Example 1 | 1.5 | 1.0 | 0.6 | 1.0 | 0.0 | 1.6 | 0.0 | 0.0 | 0.0 | 0.0 | 0.0 | 5.0 | 0.0 | 3.1 | 2000 | 5.0E+10 | 0.20 | |
| Example 6a | 1.5 | 2.5 | 0.6 | 1.0 | 0.0 | 1.6 | 0.0 | 0.0 | 0.0 | 0.0 | 0.0 | 5.0 | 0.0 | 3.2 | 1800 | 1.0E+10 | 0.24 | |
| Example 7 | 1.5 | 3.0 | 0.6 | 1.0 | 0.0 | 1.6 | 0.0 | 0.0 | 0.0 | 0.0 | 0.0 | 5.0 | 0.0 | 3.2 | 1500 | 1.0E+09 | 0.29 | |
| Comparative Example 8 | 1.5 | 3.1 | 0.6 | 1.0 | 0.0 | 1.6 | 0.0 | 0.0 | 0.0 | 0.0 | 0.0 | 5.0 | 0.0 | 3.2 | 1300 | 1.0E+08 | 0.33 | |
| Comparative Example 9 | 1.5 | 1.0 | 0.1 | 0.0 | 0.0 | 0.1 | 0.0 | 0.0 | 0.0 | 0.0 | 0.0 | 5.0 | 0.0 | 2.9 | Immeasurable due to Insufficient Sintering | | | |
| Example 8 | 1.5 | 1.0 | 0.2 | 0.0 | 0.0 | 0.2 | 0.0 | 0.0 | 0.0 | 0.0 | 0.0 | 5.0 | 0.0 | 3.1 | 2000 | 5.0E+10 | 0.20 | |
| Example 1 | 1.5 | 1.0 | 0.6 | 1.0 | 0.0 | 1.6 | 0.0 | 0.0 | 0.0 | 0.0 | 0.0 | 5.0 | 0.0 | 3.1 | 2000 | 5.0E+10 | 0.20 | |
| Example 8a | 1.5 | 1.0 | 2.5 | 1.0 | 0.0 | 3.5 | 0.0 | 0.0 | 0.0 | 0.0 | 0.0 | 5.0 | 0.0 | 3.1 | 1800 | 5.0E+10 | 0.20 | |
| Example 9 | 1.5 | 1.0 | 3.0 | 1.0 | 0.0 | 4.0 | 0.0 | 0.0 | 0.0 | 0.0 | 0.0 | 5.0 | 0.0 | 3.1 | 1500 | 5.0E+10 | 0.15 | |
| Example 9a | 1.5 | 1.0 | 2.0 | 1.0 | 1.0 | 4.0 | 0.0 | 0.0 | 0.0 | 0.0 | 0.0 | 5.0 | 0.0 | 3.1 | 1500 | 5.0E+10 | 0.15 | |
| Comparative Example 10 | 1.5 | 1.0 | 3.1 | 1.0 | 0.0 | 4.1 | 0.0 | 0.0 | 0.0 | 0.0 | 0.0 | 5.0 | 0.0 | 3.2 | 1300 | 5.0E+10 | 0.15 | |
| Example 10 | 1.5 | 1.0 | 0.6 | 1.0 | 0.0 | 1.6 | 0.05 | 0.0 | 0.0 | 0.0 | 0.0 | 5.0 | 0.0 | 3.1 | 2000 | 5.0E+10 | 0.20 | |
| Example 1 | 1.5 | 1.0 | 0.6 | 1.0 | 0.0 | 1.6 | 0.3 | 0.0 | 0.0 | 0.0 | 0.0 | 5.0 | 0.0 | 3.2 | 2200 | 5.0E+10 | 0.20 | |
| Example 10a | 1.5 | 1.0 | 0.6 | 1.0 | 0.0 | 1.6 | 1.5 | 0.0 | 0.0 | 0.0 | 0.0 | 5.0 | 0.0 | 3.2 | 2200 | 5.0E+10 | 0.20 | |
| Example 11 | 1.5 | 1.0 | 0.6 | 1.0 | 0.0 | 1.6 | 0.0 | 0.3 | 0.0 | 0.0 | 0.0 | 5.0 | 0.0 | 3.2 | 2300 | 1.0E+10 | 0.29 | |
| Example 1 | 1.5 | 1.0 | 0.6 | 1.0 | 0.0 | 1.6 | 0.0 | 0.0 | 0.0 | 0.0 | 0.0 | 5.0 | 0.0 | 3.1 | 2000 | 5.0E+10 | 0.20 | |
| Example 12 | 1.5 | 1.0 | 0.6 | 1.0 | 0.0 | 1.6 | 0.0 | 1.0 | 0.0 | 0.0 | 0.0 | 5.0 | 0.0 | 3.1 | 2000 | 1.0E+11 | 0.15 | |
| Example 12a | 1.5 | 1.0 | 0.6 | 1.0 | 0.0 | 1.6 | 0.0 | 0.3 | 0.0 | 0.0 | 0.0 | 5.0 | 0.0 | 3.1 | 2000 | 5.0E+11 | 0.10 | |
| Example 13 | 1.5 | 1.0 | 0.6 | 1.0 | 0.0 | 1.6 | 0.0 | 0.0 | 0.0 | 0.0 | 0.0 | 5.0 | 0.0 | 3.1 | 1900 | 5.0E+11 | 0.10 | |

TABLE 1-continued

| | Sub-Component (Parts by Mass with respect to 100 Parts by Mass of Main Component) | | | | | | | | | | | Sub-Component Li-Containing Glass (Parts by Mass with respect to Total of 100 Parts by Mass of Main Component and Sub-Component Excluding Li-Containing Glass) | | | Evaluation | | | |
|---|---|---|---|---|---|---|---|---|---|---|---|---|---|---|---|---|---|---|
| | CuO | $B_2O_3$ | CaO | SrO | BaO | CaO + SrO + BaO | MnO | $TiO_2$ | $Al_2O_3$ | $ZrO_2$ | Ag | Li-Containing Glass CaO–$SiO_2$–$Li_2O$-Based | $SiO_2$–BaO–CaO | Li-Containing Glass $Al_2O_3$–$SiO_2$–BaO–CaO–$Li_2O$-Based | Sintered Density (g/cm³) | Q Value | IR after PCT (Ω-cm) | Ag Concentration (wt %) |
| Example 1 | 1.5 | 1.0 | 0.6 | 1.0 | 0.0 | 1.6 | 0.0 | 0.0 | 0.0 | 0.0 | 0.0 | 5.0 | 0.0 | 0.0 | 3.1 | 2000 | 5.0E+10 | 0.20 |
| Example 14 | 1.5 | 1.0 | 0.6 | 1.0 | 0.0 | 1.6 | 0.0 | 0.0 | 0.3 | 0.0 | 0.0 | 5.0 | 0.0 | 0.0 | 3.1 | 2000 | 1.0E+11 | 0.15 |
| Example 14a | 1.5 | 1.0 | 0.6 | 1.0 | 0.0 | 1.6 | 0.0 | 0.0 | 1.0 | 0.0 | 0.0 | 5.0 | 0.0 | 0.0 | 3.1 | 2000 | 5.0E+11 | 0.10 |
| Example 14b | 1.5 | 1.0 | 0.6 | 1.0 | 0.0 | 1.6 | 0.0 | 0.0 | 2.0 | 0.0 | 0.0 | 5.0 | 0.0 | 0.0 | 3.1 | 2000 | 5.0E+11 | 0.10 |
| Example 15 | 1.5 | 1.0 | 0.6 | 1.0 | 0.0 | 1.6 | 0.0 | 0.0 | 3.0 | 0.0 | 0.0 | 5.0 | 0.0 | 0.0 | 3.1 | 1900 | 5.0E+11 | 0.10 |
| Example 1 | 1.5 | 1.0 | 0.6 | 1.0 | 0.0 | 1.6 | 0.0 | 0.0 | 0.0 | 0.0 | 0.0 | 5.0 | 0.0 | 0.0 | 3.1 | 2000 | 5.0E+10 | 0.20 |
| Example 16 | 1.5 | 1.0 | 0.6 | 1.0 | 0.0 | 1.6 | 0.3 | 1.0 | 1.0 | 0.0 | 0.0 | 5.0 | 0.0 | 0.0 | 3.1 | 2000 | 5.0E+11 | 0.08 |
| Example 19 | 1.5 | 1.0 | 0.6 | 1.0 | 0.0 | 1.6 | 0.3 | 1.0 | 1.0 | 0.2 | 0.0 | 5.0 | 0.0 | 0.0 | 3.2 | 2000 | 5.0E+11 | 0.06 |
| Example 20 | 1.5 | 1.0 | 0.6 | 1.0 | 0.0 | 1.6 | 0.3 | 1.0 | 1.0 | 2.0 | 0.0 | 0.0 | 5.0 | 0.0 | 3.2 | 2100 | 5.0E+11 | 0.06 |
| Example 21 | 1.5 | 1.0 | 0.6 | 1.0 | 0.0 | 1.6 | 0.3 | 1.0 | 1.0 | 3.0 | 0.0 | 0.0 | 5.0 | 0.0 | 3.2 | 2300 | 5.0E+11 | 0.06 |
| Example 22 | 1.5 | 1.0 | 0.6 | 1.0 | 0.0 | 1.6 | 0.3 | 1.0 | 0.0 | 0.0 | 0.0 | 0.0 | 5.0 | 0.0 | 3.2 | 2200 | 5.0E+11 | 0.06 |
| Example 1 | 1.5 | 1.0 | 0.6 | 1.0 | 0.0 | 1.6 | 0.0 | 0.0 | 0.0 | 0.0 | 0.0 | 5.0 | 0.0 | 0.0 | 3.1 | 2000 | 5.0E+10 | 0.20 |
| Example 17 | 1.5 | 1.0 | 0.6 | 1.0 | 0.0 | 1.6 | 0.0 | 0.0 | 0.0 | 0.0 | 0.05 | 5.0 | 0.0 | 0.0 | 3.1 | 1800 | 5.0E+10 | 0.15 |
| Example 18 | 1.5 | 1.0 | 0.6 | 1.0 | 0.0 | 1.6 | 0.0 | 0.0 | 0.0 | 0.0 | 1.0 | 5.0 | 0.0 | 0.0 | 3.1 | 1500 | 5.0E+10 | 0.10 |

From Table 1, in the examples of which all of the compositions were within the range of the invention, a sufficient sintered density was capable of being obtained even in the case of being fired at a low temperature of 900° C. Then, the Q value and the humidity resistance were excellent, and the Ag diffusion was also capable of being sufficiently suppressed.

In contrast, in the comparative examples of which the composition of any sub-component deviated from the range of the invention, at least any one of the sintered density, the Q value, the humidity resistance, and the Ag diffusion suppression was not excellent.

In addition, the composition of the sintered body of the dielectric ceramic composition in Example 19 which was obtained by being fired at a firing temperature of 900° C. for 2 hours was measured and confirmed. Specifically, the sintered body was pulverized to be a powder and was subjected to ICP emission spectroscopic analysis. The measured values are shown in Table 2. In addition, the compositions to be calculated from an additive amount of each of the components are also shown.

The measured value of the amount of $Mg_2SiO_4$ (the main component) shown in Table 2 was obtained in terms of a Mg concentration obtained by the ICP emission spectroscopic analysis. In addition, the amounts of the other components shown in Table 2, were obtained in terms of the oxide with respect to 100 parts by mass of the amount of $Mg_2SiO_4$.

In $Al_2O_3$ and CaO, there are a portion to be added as a sub-component independent from the $Mg_2SiO_4$ crystal powder, and a portion to be included in the Li-containing glass. In the calculated values of Table 2, such portions were combined together.

TABLE 2

| Component Unit | $Mg_2SiO_4$ (Main Component) | $B_2O_3$ | $Li_2O$ | SrO | $Al_2O_3$ | BaO | CaO | MnO | CuO | $TiO_2$ | ZnO | $ZrO_2$ |
|---|---|---|---|---|---|---|---|---|---|---|---|---|
| | | Parts by Mass with respect to 100 Parts by Mass of Main Component | | | | | | | | | | |
| Example 19 Calculated Value of Additive Amount | 100 | 1.00 | 0.85 | 1.00 | 1.27 | 1.49 | 1.56 | 0.30 | 1.50 | 1.00 | 0.00 | 0.00 |
| Measured Value of Sintered Body (ICP) | 100 | 1.04 | 0.83 | 1.04 | 1.55 | 1.45 | 1.59 | 0.30 | 1.54 | 1.04 | 0.01 | 0.51 |

From Table 2, in this example, it was possible to confirm that the calculated value of the amount of each of the components other than $Al_2O_3$ and $ZrO_2$ was approximately coincident with the measured value. Further, it was possible to confirm that the amount of each of the components was within the range of the invention.

In addition, the measured value of the amount of $Al_2O_3$ and $ZrO_2$ was larger than the calculated value. This is because an yttria-stabilized zirconia (YSZ) ball or an $Al_2O_3$ ball is used as media, in each mixing process. However, it was possible to confirm that both of the calculated value and the measured value of the amount of $Al_2O_3$ and $ZrO_2$ were within the range of the invention.

Furthermore, the amount of ZnO was less than 0.05 part by mass in the measured value, and thus, it was possible to confirm that ZnO was not substantially contained.

The invention claimed is:

1. A dielectric ceramic composition, comprising:
   $Mg_2SiO_4$ as a main component; and
   an R-containing compound, a Cu-containing compound, a B-containing compound, and Li-containing glass, as sub-components, wherein:
   R is an alkaline earth metal;
   greater than or equal to 0.2 part by mass and less than or equal to 4.0 parts by mass of the R-containing compound is contained in terms of RO, greater than or equal to 0.5 part by mass and less than or equal to 3.0 parts by mass of the Cu-containing compound is contained in terms of CuO, and greater than or equal to 0.2 part by mass and less than or equal to 3.0 parts by mass of the B-containing compound is contained in terms of $B_2O_3$, with respect to 100 parts by mass of the main component;
   greater than or equal to 2 parts by mass and less than or equal to 10 parts by mass of the Li-containing glass is contained with respect to the total of 100 parts by mass of the main component and the sub-components excluding the Li-containing glass; and
   a Zn-containing compound is not substantially contained.

2. The dielectric ceramic composition according to claim 1, further comprising:
   a Mn-containing compound as a sub-component,
   wherein greater than or equal to 0.05 part by mass and less than or equal to 1.5 parts by mass of the Mn-containing compound is contained in terms of MnO, with respect to 100 parts by mass of the main component.

3. The dielectric ceramic composition according to claim 1, further comprising:
   a Ti-containing compound as a sub-component,
   wherein greater than or equal to 0.3 part by mass and less than or equal to 3.0 parts by mass of the Ti-containing compound is contained in terms of $TiO_2$, with respect to 100 parts by mass of the main component.

4. The dielectric ceramic composition according to claim 2, further comprising:
   a Ti-containing compound as a sub-component,
   wherein greater than or equal to 0.3 part by mass and less than or equal to 3.0 parts by mass of the Ti-containing compound is contained in terms of $TiO_2$, with respect to 100 parts by mass of the main component.

5. The dielectric ceramic composition according to claim 1, further comprising:
   an Al-containing compound as a sub-component,
   wherein greater than or equal to 0.3 part by mass and less than or equal to 3.0 parts by mass of the Al-containing compound is contained in terms of $Al_2O_3$, with respect to 100 parts by mass of the main component.

6. The dielectric ceramic composition according to claim 2, further comprising:
   an Al-containing compound as a sub-component, wherein greater than or equal to 0.3 part by mass and less than or equal to 3.0 parts by mass of the Al-containing compound is contained in terms of $Al_2O_3$, with respect to 100 parts by mass of the main component.

7. The dielectric ceramic composition according to claim 3, further comprising:
an Al-containing compound as a sub-component,
wherein greater than or equal to 0.3 part by mass and less than or equal to 3.0 parts by mass of the Al-containing compound is contained in terms of $Al_2O_3$, with respect to 100 parts by mass of the main component.

8. The dielectric ceramic composition according to claim 4, further comprising:
an Al-containing compound as a sub-component,
wherein greater than or equal to 0.3 part by mass and less than or equal to 3.0 parts by mass of the Al-containing compound is contained in terms of $Al_2O_3$, with respect to 100 parts by mass of the main component.

9. The dielectric ceramic composition according to claim 1, further comprising:
a Zr-containing compound as a sub-component,
wherein greater than or equal to 0.2 part by mass and less than or equal to 3.0 parts by mass of the Zr-containing compound is contained in terms of $ZrO_2$, with respect to 100 parts by mass of the main component.

10. The dielectric ceramic composition according to claim 2, further comprising:
a Zr-containing compound as a sub-component,
wherein greater than or equal to 0.2 part by mass and less than or equal to 3.0 parts by mass of the Zr-containing compound is contained in terms of $ZrO_2$, with respect to 100 parts by mass of the main component.

11. The dielectric ceramic composition according to claim 3, further comprising:
a Zr-containing compound as a sub-component,
wherein greater than or equal to 0.2 part by mass and less than or equal to 3.0 parts by mass of the Zr-containing compound is contained in terms of $ZrO_2$, with respect to 100 parts by mass of the main component.

12. The dielectric ceramic composition according to claim 4, further comprising:
a Zr-containing compound as a sub-component,
wherein greater than or equal to 0.2 part by mass and less than or equal to 3.0 parts by mass of the Zr-containing compound is contained in terms of $ZrO_2$, with respect to 100 parts by mass of the main component.

13. The dielectric ceramic composition according to claim 5, further comprising:
a Zr-containing compound as a sub-component,
wherein greater than or equal to 0.2 part by mass and less than or equal to 3.0 parts by mass of the Zr-containing compound is contained in terms of $ZrO_2$, with respect to 100 parts by mass of the main component.

14. The dielectric ceramic composition according to claim 6, further comprising:
a Zr-containing compound as a sub-component,
wherein greater than or equal to 0.2 part by mass and less than or equal to 3.0 parts by mass of the Zr-containing compound is contained in terms of $ZrO_2$, with respect to 100 parts by mass of the main component.

15. The dielectric ceramic composition according to claim 7, further comprising:
a Zr-containing compound as a sub-component,
wherein greater than or equal to 0.2 part by mass and less than or equal to 3.0 parts by mass of the Zr-containing compound is contained in terms of $ZrO_2$, with respect to 100 parts by mass of the main component.

16. The dielectric ceramic composition according to claim 8, further comprising:
a Zr-containing compound as a sub-component,
wherein greater than or equal to 0.2 part by mass and less than or equal to 3.0 parts by mass of the Zr-containing compound is contained in terms of $ZrO_2$, with respect to 100 parts by mass of the main component.

17. A dielectric ceramic composition, comprising:
$Mg_2SiO_4$ as a main component; and
an R-containing compound, a Cu-containing compound, a B-containing compound, Li-containing glass, and Ag as sub-components, wherein:
R is an alkaline earth metal;
greater than or equal to 0.2 part by mass and less than or equal to 4.0 parts by mass of the R-containing compound is contained in terms of RO, greater than or equal to 0.5 part by mass and less than or equal to 3.0 parts by mass of the Cu-containing compound is contained in terms of CuO, and greater than or equal to 0.2 part by mass and less than or equal to 3.0 parts by mass of the B-containing compound is contained in terms of $B_2O_3$ with respect to 100 parts by mass of the main component;
greater than or equal to 2 parts by mass and less than or equal to 10 parts by mass of the Li-containing glass is contained with respect to the total of 100 parts by mass of the main component and the sub-components excluding the Li-containing glass; and
greater than or equal to 0.05 part by mass and less than or equal to 1.0 part by mass of Ag is contained with respect to the total of 100 parts by mass of the main component and the sub-components excluding the Li-containing glass.

18. The dielectric ceramic composition according to claim 17, further comprising:
a Mn-containing compound as a sub-component,
wherein greater than or equal to 0.05 part by mass and less than or equal to 1.5 parts by mass of the Mn-containing compound is contained in terms of MnO, with respect to 100 parts by mass of the main component.

19. The dielectric ceramic composition according to claim 17, further comprising:
a Ti-containing compound as a sub-component,
wherein greater than or equal to 0.3 part by mass and less than or equal to 3.0 parts by mass of the Ti-containing compound is contained in terms of $TiO_2$, with respect to 100 parts by mass of the main component.

20. An electronic component, comprising:
a dielectric layer formed of the dielectric ceramic composition according to claim 1.

* * * * *